United States Patent [19]

Yoshida et al.

[11] Patent Number: 5,066,099
[45] Date of Patent: Nov. 19, 1991

[54] REAR PROJECTION SCREEN AND METHOD OF PRODUCING THE SAME

[75] Inventors: Takahoko Yoshida, Miura; Masayuki Muranaka, Yokohama; Hiroki Yoshikawa, Hiratsuka; Koji Hirata, Kamakura; Isao Yoshizaki, Yokohama; Masakuni Teratani, Setagaya; Nobuhiro Konuma, Yokohama, all of Japan

[73] Assignee: Hitachi, Ltd., Tokyo, Japan

[21] Appl. No.: 513,854

[22] Filed: Apr. 24, 1990

[30] Foreign Application Priority Data

Apr. 26, 1989 [JP] Japan .................................. 1-104435

[51] Int. Cl.⁵ .............................................. G03B 21/60
[52] U.S. Cl. .................................... 359/457; 359/453; 359/599
[58] Field of Search ................................ 350/126–129, 350/167; 430/324, 321, 394, 396, 946, 7, 295

[56] References Cited

U.S. PATENT DOCUMENTS 4,752,116 6/1988 Sekiguchi ........................... 350/128

FOREIGN PATENT DOCUMENTS 63-199338 8/1988 Japan .

Primary Examiner—Richard A. Wintercorn
Attorney, Agent, or Firm—Antonelli, Terry, Stout & Kraus

[57] ABSTRACT

A rear projection screen for use in a rear projection image display device comprises one or more sheet members through which light is sequentially transmitted from the side of a plane of incidence of the screen, the last sheet member comprising a transparent material as a base thereof, and a light diffusing layer provided on the side of a plane of emergence of the base. A light diffuser having a refractive index different from that of the base may be dispersed in the base so as to contrive a greater viewing angle. Further, a transparent binder for supporting the light diffuser dispersed in the light diffusing layer or the light diffuser itself may be colored in order to obtain a further enhanced contrast.

24 Claims, 8 Drawing Sheets

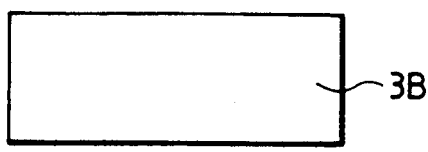
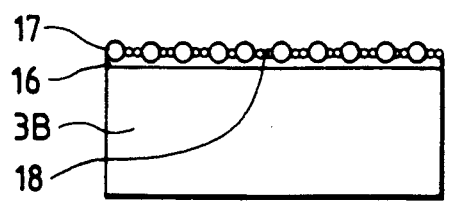
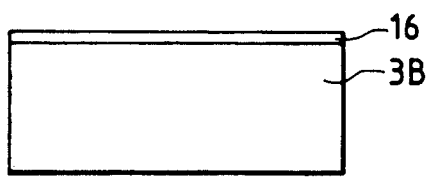
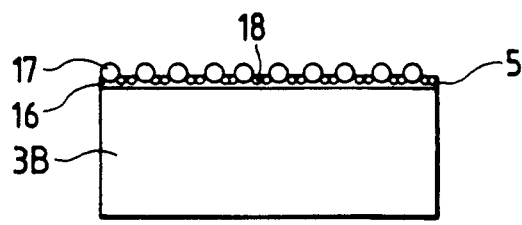
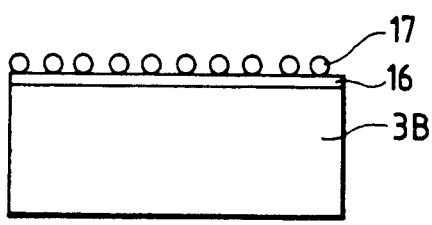
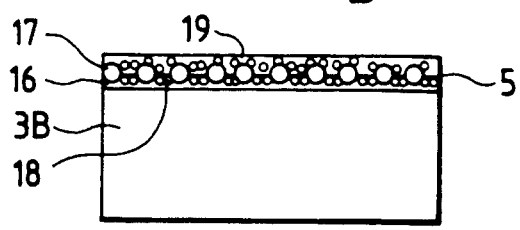
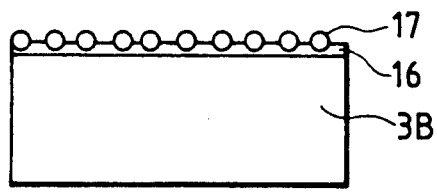

REAR PROJECTION SCREEN AND METHOD OF PRODUCING THE SAME

BACKGROUND OF THE INVENTION

This invention relates to a rear projection image display device in which an image displayed on a video source is enlarged by a projection lens and projected for imaging on a rear projection screen from the rear side, a rear projection screen for the image display device, and a method of producing the same.

The rear projection type television, in which an image displayed on a small video source such as a projection-type cathode-ray tube (CRT) is enlarged by a projection lens and projected on a rear projection screen, has recently been applied more and more widely to home and business uses, because of the remarkably enhanced image quality and of the pleasure of powerful presence it gives to the viewers through a large screen.

Where a projection-type CRT is used in the rear projection type television, it has been the common practice to use respective sets of a CRT and a projection lens for three primary colors, i.e., red, green and blue, and combine the three primary color images with each other on the screen, for producing sufficiently bright images on the screen. In order to minimize the variations in the color balance of the red, green and blue primary colors with variations in the position of the viewer or the angle at which the screen is viewed, there has been generally used a construction in which, as for instance described in Japanese Patent Application Laid-Open (KOKAI) No. 58-192022 (1983), a rear projection screen is composed by combining a first sheet member comprising a Fresnel lens with a second sheet member which has a plane of incidence and a plane of emergence each comprising a lenticular lens array and which comprises dispersed therein a particulate material for scattering light.

FIG. 1 shows a perspective view of an important portion of a rear projection screen according to the prior art as mentioned above. In the figure, there are shown the rear projection screen 1, a first sheet member 2, a second sheet member 3, and respective bases 2B and 3B of the first and second sheet members 2 and 3. A flat surface 21 constitutes a plane of incidence of the sheet member 2. A plane of emergence 22 of the first sheet member 2 comprises a Fresnel lens. A plane of incidence 31 of the second sheet member 3 has a configuration in which lenticular lenses with the longitudinal direction thereof set in the vertical direction are arrayed in the horizontal direction. On a plane of emergence 32 of the second sheet member 3, lenticular lenses similar to the above are arrayed substantially opposite to the lenticular lenses on the plane of incidence 31. Light non-transmitting areas 3N (namely, the areas in which light is not transmitted) at the boundary portions of the lenticular lenses have flat surfaces for providing thereon a light absorbing layer, as described below. The light absorbing layer 6 is provided on the light non-transmitting areas 3N. The second sheet member 3 has particulates of a light diffuser, for scattering light, dispersed in the base 3B.

In the conventional rear projection screen as above, a luminous flux emerging from the entire part of the image displayed on the projection-type CRT comes to be incident on the entire part of the plane of incidence while diverging through a projection lens. In this case, the Fresnel lens at the plane of emergence 22 of the first sheet member 2 of the screen converts the incident luminous flux into a substantially parallel luminous flux, which is incident on the second sheet member 3. The light incident on the second sheet member 3 forms an image at the focus on the plane of emergence 32 under the function of the lenticular lenses on the plane of incidence 31, and the light emerges to the viewer's side while being diffused horizontally from the focus. The resolution of the rear projection screen 1 is enhanced when the configuration of the lenticular lenses on the plane of incidence 31 of the second sheet member 3 is so designed as to reduce, as much as possible, the focus on the plane of emergence 32 of the sheet member 3.

FIGS. 2a and 2b each shows a sectional view of the second sheet member 3 of the conventional rear projection screen 1 mentioned above, wherein FIG. 2a is a vertical sectional view through the center of one lenticular lens, and FIG. 2b is a horizontal sectional view.

In FIGS. 2a and 2b, particulates of a light diffuser are dispersed in the base 3B of the second sheet member 3, as mentioned above, whereby a beam of light 14 incident on the plane of incidence 31 proceeds while being diffused horizontally and vertically, to emerge through the plane of emergence 32 to the viewer's side. An increase in the amount of the light diffuser causes an increase in the angular range of diffusion of light, namely, the so-called viewing angle. As shown in FIG. 2a, however, the incident light beam 14 is diffused by the light diffuser before reaching the focus on the pane of emergence 32. Therefore, the more the amount of the light diffuser is increased for the purpose of enlarging the viewing angle, the more fuzzier the image formed at the focus on the plane of emergence 32, and the greater the spot diameter d at the plane 32, resulting in lower focusing characteristics and poorer resolution.

In the above-mentioned rear projection screen 1 according to the prior art, the plane of incidence 31 of the second sheet member 3 comprises an array of lenticular lenses of which the longitudinal direction is set in the vertical direction of the screen, as mentioned above. The focal plane of the lenticular lenses constitutes the pane of emergence 32 of the second sheet member 3. On the plane of emergence 32, the foci of the lenticular lenses are arranged at the same pitch as the pitch of the lenticular lenses on the plane of incidence of the second sheet member, and light non-transmitting areas 3N through which light is substantially not transmitted are present between the foci. For the purpose of reducing reflection of ambient light such as illuminating light to thereby enhance the contrast of images, therefore, a light absorbing layer 6 is provided on the plane of emergence 32 of the second sheet member 3 in the light non-transmitting areas 3N. The light absorbing layer 6, appearing as if black straight lines in the vertical direction of the screen were arranged in parallel, is generally called "black stripes".

As has been mentioned above, the light incident on the lenticular lens surface of the second sheet member 3 is diffused by the light diffuser before reaching the focus on the plane of emergence 32. Therefore, as shown in FIG. 2b, part 14-1 of the light is absorbed by the light absorbing layer 6, without reaching the focus of the lenticular lens. There has thus been the problem that the quantity of light at a bright image portion is reduced, resulting in a lower contrast.

Besides, in the conventional rear projection screen 1 mentioned above, both the first and second sheet members 2 and 3 are generally provided by using thermoplastic resins for the bases thereof, from the viewpoint of productivity. The thermoplastic resins, however, are inferior to metals and glasses in hardness. Especially, the second sheet member 3 is exposed to the viewer's side, adjacently to a casing of a rear projection image display device; therefore, the second sheet member 3, if formed by use of a thermoplastic resin for the base thereof, would be easily damaged during handling of the display device.

SUMMARY OF THE INVENTION

This invention contemplates a solution to the above-mentioned problems involved in the prior art.

It is accordingly an object of this invention to provide a rear projection image display device having good focusing characteristics and contrast, a rear projection screen for use in the display device, and a method of producing the same.

It is another object of this invention to provide a rear projection screen of which a surface exposed to the viewer's side is hardly damaged, a method of producing the rear projection screen, and a rear projection image display device using the rear projection screen.

For attaining the above objects, a rear projection screen according to this invention, comprising one or more sheet members through which light is sequentially transmitted from the side of a pane of incidence of the screen, uses a substantially transparent material for the last sheet member through which the light is transmitted last, and a light diffusing layer provided on the side of a plane of emergence of the base. Further, a light diffuser having a refractive index different from the refractive index of the base may be dispersed in the base.

Especially for better contrast, in addition to the above-mentioned construction, a transparent binder for dispersing and supporting therein the light diffuser in the light diffusing layer or the light diffuser itself may be colored.

Moreover, in addition to the above-mentioned, a light absorbing layer may be provided on the plane of emergence of the above-mentioned sheet member, in light non-transmitting areas of a lenticular lens array.

Furthermore, for attaining the above-mentioned another object, the transparent binder in the light diffusing layer and the light absorbing layer may each comprise a material having a hardness higher than the hardness of the base of the above-mentioned sheet member.

BRIEF DESCRIPTION OF THE DRAWINGS

FIGS. 14a to 14g are sectional views illustrating the steps for producing the second sheet member in the rear projection screen of FIG. 13.

DESCRIPTION OF THE PREFERRED EMBODIMENTS

In the rear projection image display device using the rear projection screen constructed as mentioned above, the light emerging from a video source such as a projection-type CRT is transmitted through a projection lens to be incident on the screen, and is let to emerge from the last sheet member without being diffused in any of the sheet members constituting the screen. When the light emerges from the last sheet member, the light is diffused horizontally and vertically by the light diffuser in the light diffusing layer on the plane of emergence of the sheet member. Therefore, an image formed on the plane of emergence is substantially not fuzzy, and good focusing characteristics are obtained.

Where the light diffuser or the transparent binder in the light diffusing layer is colored, reflectance of ambient light at the surface of the light diffusing layer is lowered. In addition, when the ambient light entering the screen emerges to the viewer's side after being reflected some times by the surfaces of the sheet members constituting the screen, the light has passed through the light diffusing layer at least two times before the emergence. Therefore, the proportion of the incident ambient light absorbed is increased, as compared with that in the conventional rear projection screen. Accordingly, undesirable brightening of dark portions of an image due to the incident ambient light is obviated, and good contrast is obtainable.

Where a light absorbing layer is provided on the plane of emergence of the screen in the light non-transmitting areas through which light is substantially not transmitted, it is ensured that the incident light on the screen is scarcely absorbed by the light absorbing layer through being diffused, prior to reaching the plane of emergence. Therefore, the efficiency of light utilization is enhanced and, as a result, a bright image is obtained. Further, the light absorbing layer is capable of reducing reflection of the ambient light such as illuminating light, thereby giving a better contrast.

Where the hardness of the transparent binder of the light diffusing layer and the hardness of the light absorbing layer are selected to be higher than the hardness of the sheet member, the hardness of the exposed surface on the viewer's side of the rear projection screen is increased, as compared with that in the conventional rear projection screen, and becomes less liable to be damaged during handling of the screen.

Now, one embodiment of this invention will be explained referring to FIGS. 3 to 9d.

Figure 3:
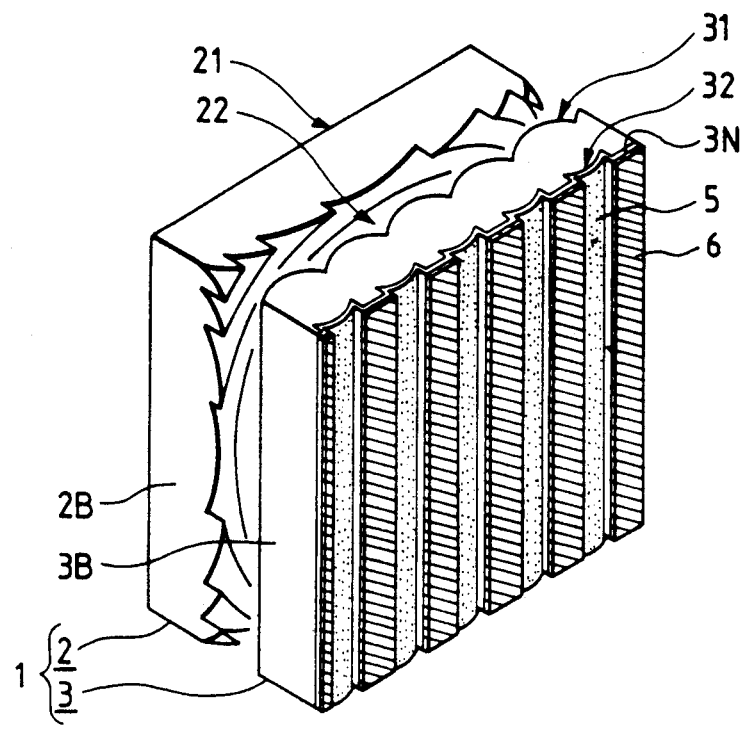
FIG. 3 shows a perspective view of an important portion of a first embodiment of a rear projection screen according to this invention.

FIG. 3 shows a perspective view of an important portion of a rear projection screen according to this invention. In the figure, there are shown the rear projection screen 1, a first sheet member 2, a second sheet member 3, and respective bases 2B and 3B of the first and second sheet members 2 and 3, the bases each comprising a substantially transparent material. The first and second sheet members 2 and 3 are attached to each other at end portions thereof (not shown). A plane of incidence 21 of the sheet member 2 is flat, in this embodiment. A plane of emergence 22 of the first sheet member 2 comprises a Fresnel lens. A plane of incidence 31 of the second sheet member 3 has a configuration in which lenticular lenses having the longitudinal direction set in the vertical direction are arrayed horizontally. A plane of emergence 32 of the second sheet member 3 is provided with an array of lenticular lenses similar to and substantially opposed to the lenticular lenses on the plane of incidence 31. Light non-transmitting areas 3N at the boundary portions of the lenticular lenses on the plane of emergence 32 are provided with flat surfaces, projected from the lenticular lenses to the viewer's side, for providing thereon the light absorbing layer (described below) by a simple method such as printing. A light diffusing layer 5 is provided on the entire surface of the plane of emergence 32 of the second sheet member 3, in a continuous layer without any break at the boundary between the light non-transmitting area 3N and the lenticular lens portion. The light absorbing layer 6 is provided on the light diffusing layer 5 on the plane of emergence 32 of the second sheet member 3, in the light non-transmitting areas 3N at the boundary portions of the lenticular lenses.

The functions of the first and second sheet members 2 and 3 in the rear projection screen 1 shown in FIG. 3 will now be explained as follows.

Figure 4:
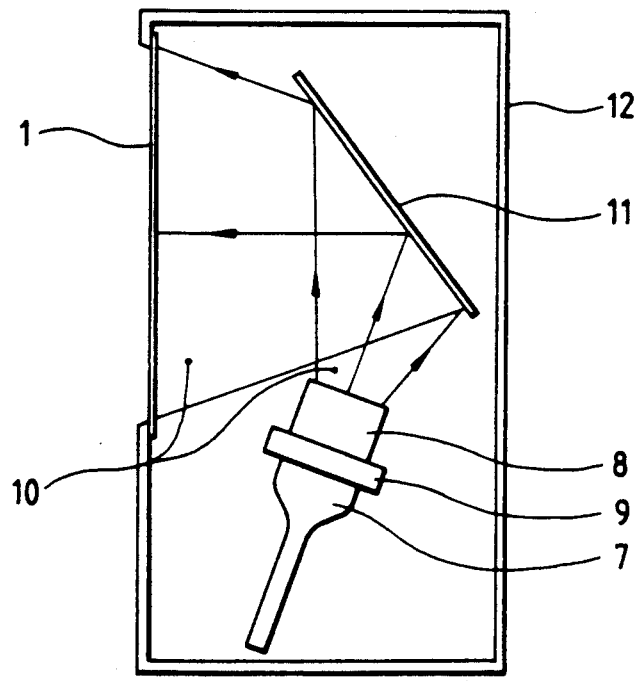
FIG. 4 shows a sectional view of an important portion of a rear projection image display device employing the rear projection screen of FIG. 3.

FIG. 4 is sectional view of an important portion of a rear projection image display device using the rear projection screen shown in FIG. 3. In FIG. 4 there are shown the rear projection screen 1, a projection-type CRT 7 as a video source, a projection lens 8, a coupler 9 for coupling the CRT 7 with the lens 8, a projection luminous flux 10, a reflecting mirror 11 for reflecting the luminous flux 10, and a casing 12.

Figure 5:
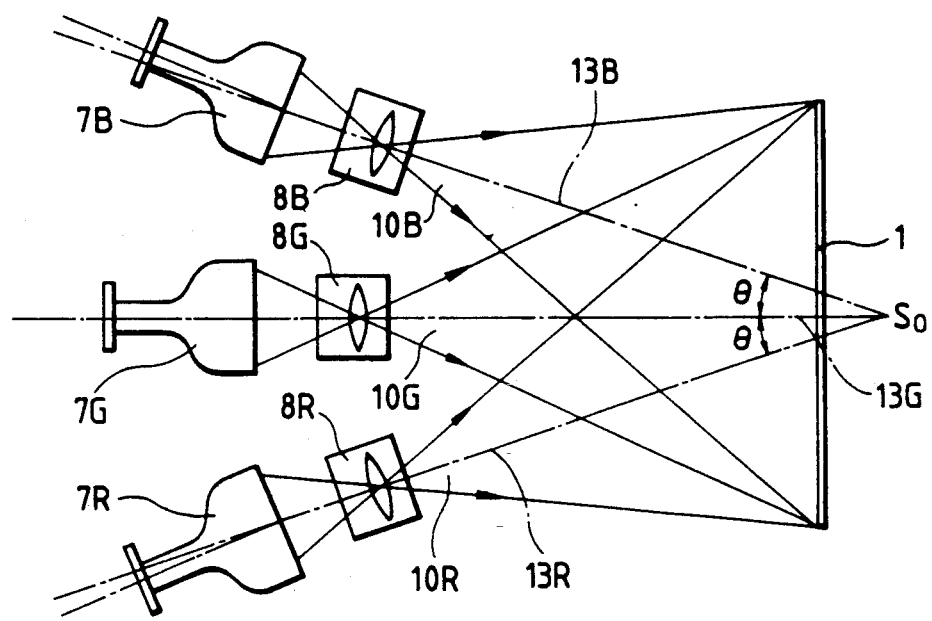
FIG. 5 shows a schematic development of a projection optical system in the rear projection image display device.

FIG. 5 is a shematic development of a projection optical system in the rear projection image display device of FIG. 4, and is different from FIG. 4 in that the reflecting mirror 11, which is unneccessary for the following explanation, is omitted.

In FIG. 5 there are shown the rear projection screen 1, projection-type CRTs 7R, 7G and 7B for red, green and blue colors, respectively, projection lenses 8R, 8G and 8B for the CRTs 7R, 7G and 7B, respectively, and red, green and blue projection luminous fluxes 10R, 10G and 10B. Optical axes 13R, 13G and 13B of the projection lenses 8R, 8G and 8B, respectively, intersect each other at a point $S_0$ in the vicinity of the center of the screen 1, at an angular offset of optical axis of $\theta$.

In FIGS. 4 and 5, the projection luminous fluxes 10, 10R, 10G and 10B are incident on the rear projection screen 1 while diverging. At pixels constituting an image on the screen 1, chief rays of light for the pixels, in regard of a specified one of the colors, are incident on the screen 1 while diverging in the directions for diffusion. When the projection luminous fluxes are diffused horizontally and vertically by the screen 1 and where a ground glass, for instance, is used for the screen 1, each given pixel appears brightest when viewed in the direction of the chief ray of light for the pixel. To a viewer present at a fixed position, therefore, only a portion of the image appears bright whereas the surrounding portions of the image appear very dark.

To avoid this problem, the rear projection screen shown in FIG. 3 has the first sheet member 2 so designed to have the function to convert the flux of image light incident on the entire surface of the plane of incidence 21 into luminous fluxes each consisting of substantially parallel rays of one of red, green and blue colors, by the Fresnel lens on the plane of emergence 22, before the incidence to the second sheet member 3, thereby improving the brightness distribution of the screen. It should be noted in this case that, at a given pixel, the angles of incidence of the red, green and blue rays on the second sheet member 3 are different from each other.

On the other hand, the second sheet member 3 has the function to diffuse the luminous flux of the image light emerging from the first sheet member 2, so as to give different directional characteristics horizontally and vertically to every pixel, before the emergence to the viewer's side. In this case, the lenticular lens array on the plane of incidence 31 of the second sheet member 3 contributes to horizontal diffusion of the image light, while the light diffusing layer 5 on the plane of emergence 32 contributes to both horizontal diffusion and vertical diffusion of the image light.

As shown in FIG. 5, the optical axis 13G for the green color intersects both the optical axes 13R and 138 for the red and blue colors at the angular offset of optical axis of $\theta$. Therefore, at each given pixel on the screen, the chief rays of red, green and blue lights are incident at different angles of incidence. When the projection luminous flux of each given color is diffused horizontally by the rear projection screen 1, each given pixel appears brightest when viewed in the direction of the chief ray of the flux. Thus, the color balance of the red, green and blue primary colors varies and, hence, the colors of the image on the screen appear to vary, depending on the horizontal position in which the viewer looks at the image. This phenomenon is called "color shift".

To suppress the "color shift" phenomenon, the rear projection screen shown in FIG. 3 comprises the lenticular lens array on the plane of emergence 32 of the second sheet member 3, whereby the directions of the chief rays of the colors emerging from each given pixel are made to be substantially parallel.

Now, the construction and function of the second sheet member 3 in the rear projection screen shown in FIG. 3 will be explained more in detail below.

Figure 6:
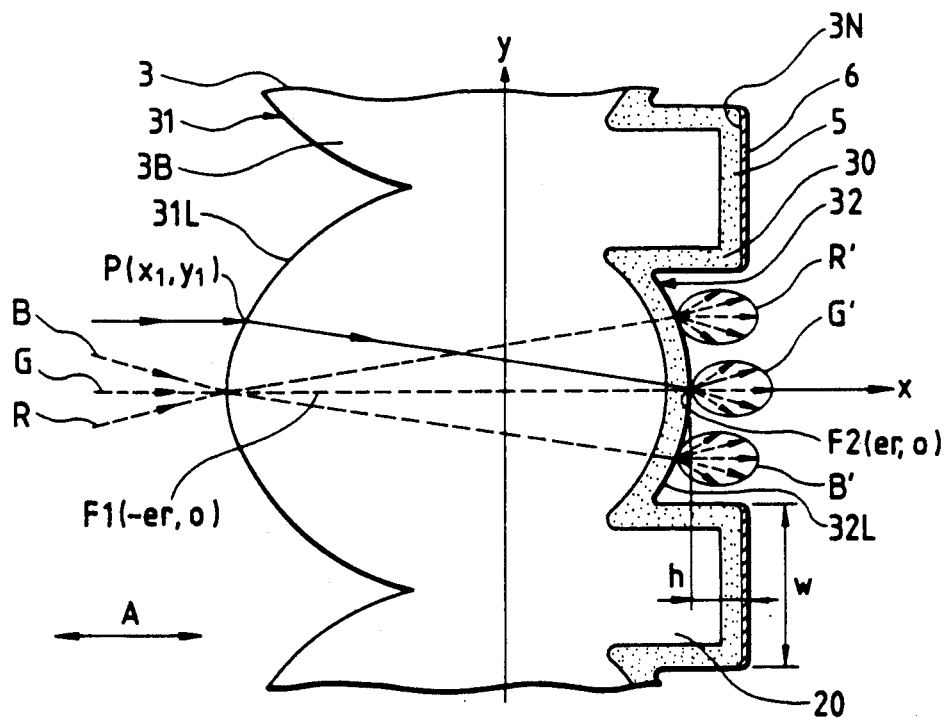
FIG. 6 shows an enlarged sectional view of a lenticular lens portion of a second sheet member in the rear projection screen of FIG. 3.

FIG. 6 shows an enlarged sectional view of a pair of lenticular lens portions at the plane of incidence 31 and the plane of emergence 32 of the second sheet member 3 in the rear projection screen shown in FIG. 3. In FIG. 6, there are shown lenticular lens surfaces 31L and 32L of the plane of incidence 31 and the plane of emergence 32.

Referring to FIG. 6, the lenticular lens surface 31L on the side of the plane of incidence is a portion of the surface of an elliptic cylinder, the relevant ellipse being such that the major axis thereof is set in the thickness direction (indicated by arrows A) of the sheet member 3, one of the two foci thereof, F1, is located in the inside of the base 3B, and the other foci F2 is located in the vicinity of the surface of the light diffusing layer 5 at the plane of emergence 32. The eccentricity e of the ellipse is selected to be approximately equal to the inverse of the refractive index n of the base 38.

On the other hand, the lenticular lens surface 32L on the side of the plane of emergence, at the surface of the light diffusing layer 5, is a portion of the surface of an eliptic cylinder substantially symmetrical with the surface of the elliptic cylinder constituting the lenticular lens surface 31L on the side of the plane of incidence.

The light diffusing layer 5 comprises a light diffuser dispersed in a transparent binder, and it is simple and economical to provide the light diffusing layer 5 by a general coating technique. To secure uniformity of the thickness of the light diffusing layer 5, it is generally necessary for the layer 5 to have a thickness of at least 2 $\mu$m. The pitch of the lenticular lens array on the plane of emergence 32 of the second sheet member 3 is preferably not more than about 1.2 mm, in order to obtain high resolution. In this case, the width of one lenticular lens exclusive of the portion of the light absorbing layer 6 is at most about 0.7 mm. If the thickness of the light diffusing layer 5 exceeds about 20% based on the width of the lenticular lens, the thickness of the light diffusing layer 5 becomes greater at a portion near the light absorbing layer 6, due to the influence of the surface tension of the coating film, thereby affecting adversely the directional characteristics in the horizontal directions. Therefore, it is generally desirable to control the thickness of the light diffusing layer 5 to within the range of about 2 to 140 $\mu$m. On the other hand, the light non-transmitting areas 3N are provided with flat surfaces at portions projected to the viewer's side relative to the lenticular lens on the plane of emergence 32 (the portions hereinafter referred to as the "projected shape portion"), as shown in FIG. 6, so as to provide the light absorbing layer 6 on the light non-transmitting area 3N. The width w and the step amount h of the projected shape portion are limited so that the rays incident on the plane of incidence 31 are not absorbed by the light absorbing layer 6. The light absorbing layer 5 is provided in a continuous form, even at the end portions of the projected shape portion which constitute the boundary between the light non-transmitting area 3N and the lenticular lens portion. Therefore, for providing the light diffusing layer 5 with a greater thickness, projected portions 20 of the base 3B in the light non-transmitting areas 3N should inevitably be reduced in width and enlarged in length, causing a formability problem in the process of producing the base 3B. When the light diffusing layer 5 is provided in a large thickness on the base 3B, sags or runs occur at the end portions 30 of the projected shape portion, so that the surface on which to provide the light absorbing layer 6 is not flat, and there are difficulties in providing the light absorbing layer 6. From these points of view, also, it is generally desirable that the thickness of the light diffusing layer 5 is not more than 140 $\mu$m.

As the light diffuser, a wide variety of materials, whether natural or synthetic, may be used. The materials usable as the light diffuser include, for example, inorganic materials such as silicon oxide, aluminum oxide, glass powder, calcium carbonate, titanium dioxide, barium sulfate, zinc oxide, mica, calcite, etc., and organic materials such as acrylic resin, polycarbonate resin, polyvinyl alcohol resin, fluororesin, melamine resin, etc. As to the particle diameter of the light diffuser, a particle diameter of less than 0.4 $\mu$m produces substantially no effect on diffusion, because of the diameter being shorter than the wave lengths of visible rays, and causes agglomeration of fine powder (the so-called blocking) leading to a lower dispersibility or the like. Due to these optical and industrial factors, it is difficult to use a light diffuser with a particle diameter of less than 0.4 $\mu$m. A particle diameter of more than about 10 $\mu$m, on the other hand, generally does not yield good directional characteristics, because there is a limit to the dispersion density of the light diffuser where the light diffusing layer has a thickness in the above-mentioned range. Thus, it is generally preferable to set the particle diameter of the light diffuser in the range of about 0.4 to 10 $\mu$m.

When a material having a hardness higher than the hardness of the base 3B of the sheet member is used as a material for the transparent binder in the light diffusing layer 5, there results the effect of rendering the rear projection screen 1 less liable to be damaged during handling thereof and of preventing the commercial value of the product from being lowered due to such damage. As the binder material, a wide range of so-called hard coating materials are usable, for instance, urethane resin, acryl-urethane resin, organic silicates, etc. Among these materials, preferred are materials which can be cured by electromagnetic waves, particularly, acrylurethane resin materials which can be cured by ultraviolet rays, from the viewpoint of film-forming workability mentioned below.

Meanwhile, as to the mixing ratio of the light diffuser and the transparent binder, use of the light diffuser in an amount of less than about 200 parts by weight per 100 parts by weight of the transparent binder has the problem that the light diffuser would be dispersed nonuniformly in the transparent binder. If the amount of the light diffuser is more than about 800 parts by weight per 100 parts by weight of the binder, the property of the binder for holding and fixing the light diffuser is markedly lowered. Thus, it is desirable to use the light diffuser in an amount of about 200 to 800 parts by weight per 100 parts by weight of the transparent binder.

When an x-y coordinate system is set as shown in FIG. 6, the elipse relevant to the surface 31L of the lenticular lens on the side of the plane of incidence is represented by the following equation:

$$x^2 + \frac{y^2}{1 - e^2} = r^2 \qquad (1)$$

where
e: eccentricity of ellipse,
$\pm r$: x-coordinates of intersections of ellipse with x-axis, which are constants.

In this case, the coordinates of a focus F1 of the ellipse is given as $(-er, 0)$, and the coordinates of the other focus F2 is given as $(er, 0)$.

When $$e = \frac{1}{n} \qquad (2)$$

where n is the refractive index of the base, all the rays of light incident on the lenticular lens in parallel to the major axis of the ellipse converge at the focus F2 on the side of the plane of emergence 32.

The reason is as follows. Let the coordinates of the point of incidence P be $(x_1, y_1)$, then from equation (1), $$x_1^2 + \frac{y_1^2}{1 - e^2} = r^2 \quad (3)$$

Therefore, the optical path length l from the plane $x = -r$ to the focus F2 is $$\begin{aligned} l &= x_1 - (-r) + n \sqrt{(er - x_1)^2 + y_1^2} \\ &= x_1 + r + n(r - ex_1) \\ &= (1 + n)r \end{aligned} \quad (4)$$

namely, the optical path length l is constant.

Accordingly, when the surface 31L of the lenticular lens on the side of the plane of incidence is shaped in conformity with the elipse as mentioned above, the incident light is converged near the center of the lenticular lens surface 32L on the side of the plane of emergence, and is not cut by the light absorbing layer 6. As a result, a screen with a high light transmissivity is obtained.

Though the refractive index of the light diffusing layer 5 has not been referred to in the above description, the refractive index may practically be regarded as equivalent to the refractive index n of the base, in the above discussion, when the thickness of the light diffusing layer 5 is less than about several per cent based on the thickness of the second sheet member 3. It is not necessary for the lenticular lens surface 32L on the emergence side to pass precisely through the focus F2 of the lenticular lens surface 31L on the incidence side, and some deviation is allowable.

Where the lenticular lens surface 32L on the emergence side is a portion of the surface of an elliptic cylinder, as shown in FIG. 6, the directionalities R', G' and B' of emergent rays, for given red, green and blue incident rays R, G and B, are capable of being made substantially parallel to each other. Thus, there is obtained the effect of reducing markedly the above-mentioned color shift.

While, in FIG. 6, the lenticular lens surface 32L on the emergence side is set as a portion of the surface of an elliptic cylinder substantially symmetrical with the elliptic cylinder of the lenticular lens surface 31L on the incidence side, such a geometry of the lenticular lens surface 32L as this is not limitative. Namely, the lenticular lens surface 32L may be a portion of a substantially elliptic or circular cylinder, projected to the viewer's side. In that case, a markedly suppressing effect on the color shift is obtained similarly to the case of the above embodiment, though the effects obtained in the two cases are sightly different.

Now, the focusing characteristics and contrast characteristics of the rear projection screen according to this embodiment will be explained below.

Figure 7A:
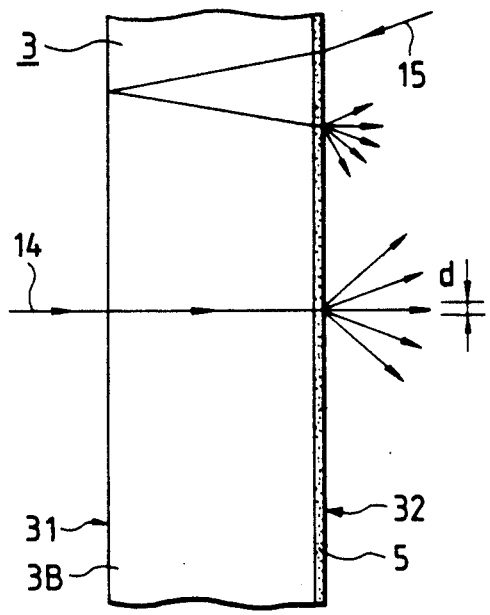
FIGS. 7a and 7b each show a sectional view of the second sheet member in the rear projection screen of FIG. 3.
Figure 7B:
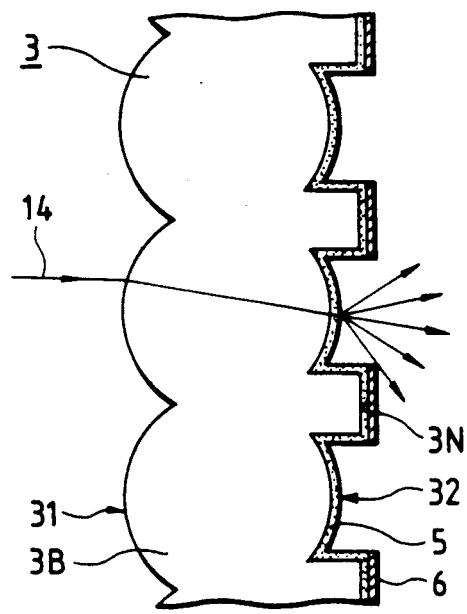

FIGS. 7a and 7b each show a sectional view of the second sheet member 3 of the rear projection screen 1 of FIG. 3. FIG. 7a is a vertical sectional view taken along the center of one lenticular lens on the plane of emergence 32, while FIG. 7b is a horizontal sectional view. In the two figures, the same portions as those in FIG. 3 are denoted by the same reference marks as used in FIG. 3, and explanation of those portions will be omitted.

Figure 1:
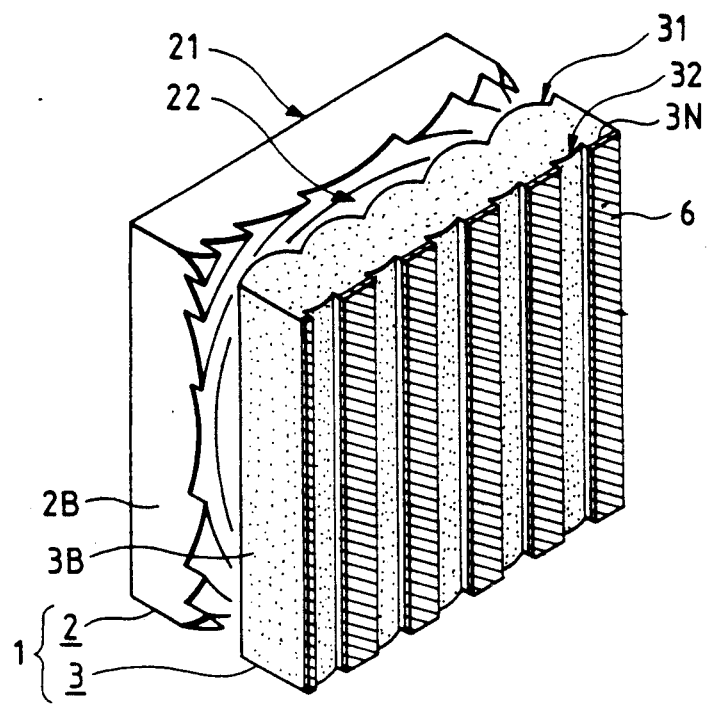
FIG. 1 shows a perspective view of an important portion of a rear projection screen according to the prior art.
Figure 2A:
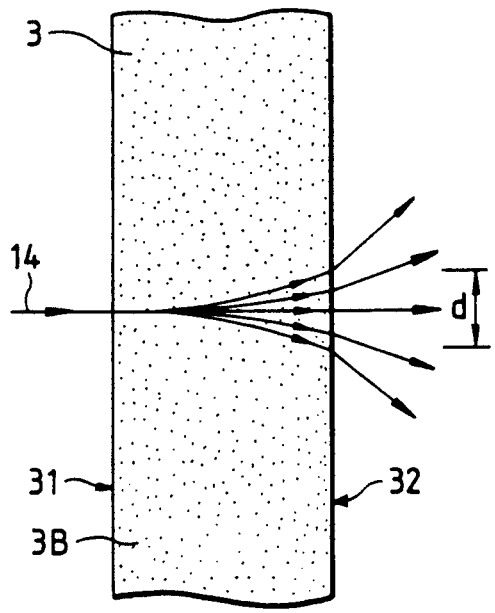
FIGS. 2a and 2b each show a sectional view of a second sheet member in the rear projection screen according to the prior art.

Referring to FIGS. 7a and 7b, an incident ray 14 entering through the plane of incidence 31 is transmitted straight through the base 3B, with little diffusion. Upon reaching the light diffusing layer 5, the ray 14 is diffused for the first time, and the diffused ray emerges to the viewer's side. When viewed from the viewer on the side of the plane of emergence 32, therefore, the light spot diameter d at the light diffusing layer 5 is very small, as compared with the corresponding spot diameter in the case of the conventional rear projection screen shown in FIG. 2a. As a result, image focusing characteristics are remarkably good, and the effect of enhancing the resolution is obtained.

Figure 2B:
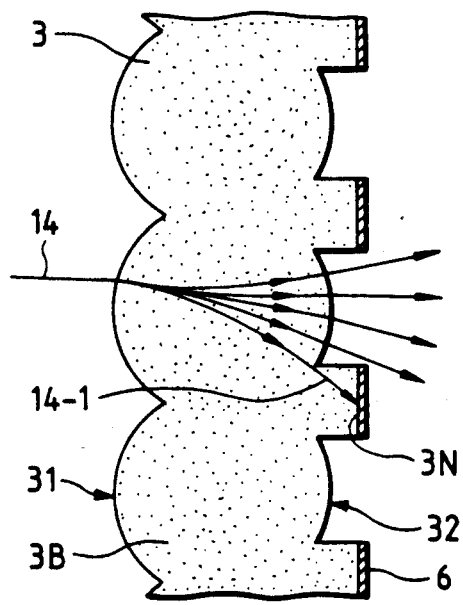

Besides, in FIG. 7b, the incident ray 14 is little diffused in the base 3B. As contrasted to the prior art shown in FIG. 2b, there is substantially no loss of light through absorption by the light absorbing layer 6, in FIG. 7b, and substantially the entire quantity of incident light is permitted to emerge. Therefore, the quantity of light in bright areas of images is increased, as compared with that in the prior art, and the effect of enhancing image contrast is obtained.

Furthermore, as shown in FIG. 7a, when ambient light 15 such as illuminating light incident on the light diffusing layer 5 emerges again to the viewer's side after being reflected by surfaces of the first and second sheet members 2 and 3, the light 15 passes through the light diffusing layer 5 at least two times before the emergence. On the other hand, the video light emitted from a small CRT serving as a video source passes through the light diffusing layer 5 only once, before emerging from the rear projection screen 1. When the light diffuser or the transparent binder in the light diffusing layer 5 is colored to be, for example, light gray or light blue, therefore, the ambient light 15 will be absorbed by the light diffusing layer 5 more than the video light. As a result, undesirable brightening of dark portions of an image in the presence of ambient light such as illuminating light is obviated, and a good contrast is effectively obtained.

In use of projection-type CRTs for the rear projection image display device, it is generally impossible in most cases to operate a blue CRT as bright as red and green CRTs, because of the saturation of luminance of the blue CRT. In such cases, the brightness of an image is limited to the brightness obtained by application of white balance to a saturation luminance of the blue CRT. In order to obtain brighter images, therefore, it is desirable to set the spectral transmissivity characteristics of the rear projection screen 1 so as to have a higher transmissivity to blue light. Thus, the coloration of the light diffuser or the transparent binder may be carried out by use of a dye or pigment, for instance, phthalocyanine blue, so as to provide a higher transmissivity to the blue light. In that case, the effect of providing good contrast against ambient light is obtained, without spoiling the brightness of images.

Figure 8:
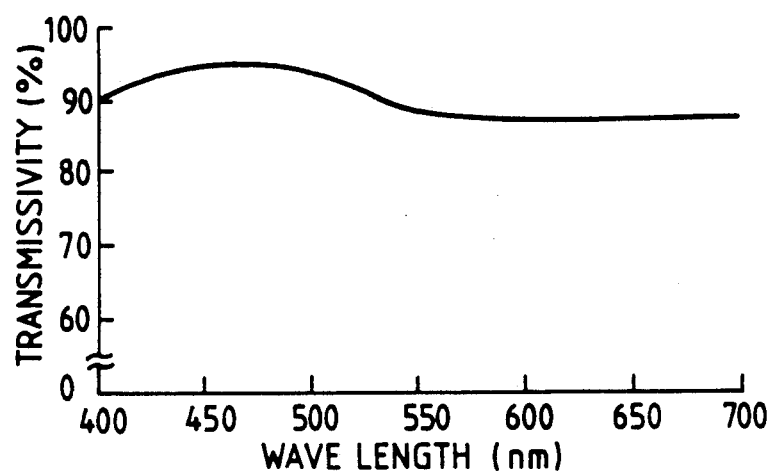
FIG. 8 is a diagram showing the spectral transmissivity obtained where a light diffusing layer of the second sheet member in the rear projection screen of FIG. 3 is colored.

FIG. 8 shows an example of spectral transmissivity obtained with coloration of the light diffusing layer 5 in the second sheet member 3. In this example, the spectral transmissivity is higher in the wave length region of 400 to about 520 nm than in other wave length regions, the characteristics being suitable for obtaining the above-mentioned effect on the rear projection image display device.

In this embodiment, the light absorbing layer 6 is provided on the light non-transmitting areas 3N of the pane of emergence 32. The light absorbing layer 6 functions to prevent reflection of ambient light, such as illuminating light, and to enhance the contrast of images. When a material having a hardness higher than the hardness of the base 3B of the sheet member, similarly to the material for the transparent binder in the light diffusing layer 5, is used for the light absorbing layer 6, damage to the screen surface during handling of the rear projection screen is effectively reduced.

In the rear projection screen 1, directional characteristics with a wide viewing angle can be obtained by increasing the amount of the light diffuser in the light diffusing layer 5. If the amount is too large, however, the viewing angle may be saturated. In such a situation, directional characteristics with an enlarged viewing angle can be obtained by dispersing, in the base 3B of the sheet member 3 in FIG. 3, a light diffuser which is similar to the light diffuser used in the light diffusing layer 5 and which differs from the base 3B in refractive index. In that case, the light diffusing layer 5 makes a predominant contribution, and the base 3B a subordinate contribution, to the diffusion of light. Though the focusing characteristics and contrast are slightly lowered by the light diffuser dispersed in the base 3B as compared with the case where no light diffuser is dispersed in the base 3B, the slightly lowered level of performance is yet by far superior to the level of performance of the conventional rear projection screen.

Now, a method of producing the second sheet member 3 of the rear projection screen 1 in FIG. 3 will be explained as follows.

FIGS. 9a to 9d are sectional views illustrating the steps for producing the second sheet member 3. The same portions as those in FIGS. 3, 6 and 7b are denoted by the same reference marks as used in FIGS. 3, 6 and 7b, and explanation of those portions will be omitted.

Figure 9A:
FIGS. 9a to 9d are sectional views illustrating the steps for producing the second sheet member in the rear projection screen of FIG. 3.
Figure 9B:
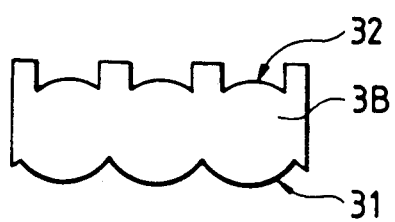

To produce the second sheet member 3 according to this embodiment, a base 3B is first prepared, as shown in FIG. 9a. It is desirable to use, as the base 3B, a transparent thermoplastic resin sheet, for instance, a sheet of an acrylic resin or a polycarbonate resin, because a processing method with high productivity such as extrusion, etc., can be adopted for processing the transparent thermoplastic resin sheets. It is unnecessary, however, to particularly specify the material for the base 3B.

First, the base 3B is formed by a known method.

Namely, the base 3B in a heated state is passed between a roll having a matrix for the geometry of the lenticular lens array for the plane of incidence of the desired sheet member 3 and a roll having a matrix for the geometry of the lenticular lens array for the plane of emergence of the sheet member 3, by use of a general extruder. By the operation, the plane of incidence 31 and the plane of emergence 32 of the sheet member 3 are formed, followed by cutting to a predetermined size. Alternatively, the base 3B is heated and pressed by a genera press using plates provided respectively with the matrices for the geometries of the lenticular lens arrays for the pane of incidence and the pane of emergence, whereby the plane of incidence 31 and the plane of emergence 32 are formed.

Figure 9C:
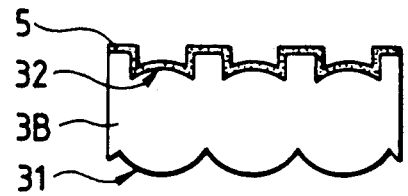

Next, a material obtained by dispersing a light diffuser in a transparent binder comprising an ultraviolet-curing resin is applied to the plane of emergence 32 of the base 3B, as shown in FIG. 9c, by a general coater. The material thus applied is incompletely cured by irradiation with ultraviolet rays, to form the light diffusing layer 5.

Figure 9D:
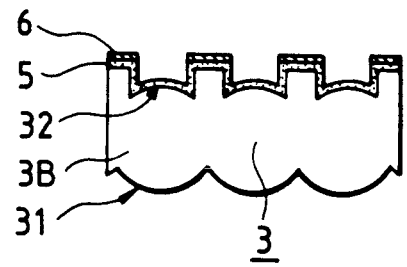

Then, a light absorbing black paint comprising an ultraviolet-curing resin is applied to light non-transmitting areas 3N at the boundary portions of the lenticular lenses on the plane of emergence 32, as shown in FIG. 9d, by a genera printing press such as an offset press. The paint thus applied is cured by irradiation with ultraviolet rays, to form the light absorbing layer 6. In this step, the light diffusing layer 5 previously cured incompletely is also cured, and the second sheet member 3 is completed.

In this embodiment, the light diffusing layer 5 is provided in a continuous form over the entire surface of the plane of emergence 32 of the second sheet member 3. without any break at the boundary between the light non-transmitting area 3N and the lenticular lens portion. This construction has the effect of enabling the formation of the light diffusing layer 5 by coating to be carried out simply by a general coater. The formation of the light diffusing layer 5 by coating is difficult to perform in the case of a construction in which the light diffusing layer 5 is discontinued at stepped portions of the projected form of the light non-transmitting areas 3N or a construction in which the light diffusing layer 5 is not provided on the light non-transmitting areas 3N but is provided only on the lenticular lens portions.

When the method comprising the step of producing the second sheet member 3 as above-mentioned is used as the method of producing the rear projection screen, it is possible to obtain easily and economically the rear projection screen according to this invention.

Besides, the light absorbing layer 6 may have an extremely small thickness. Therefore, the material for forming the light absorbing layer 6 is not limited to the light absorbing paint comprising the ultraviolet-curing resin mentioned above, and a heat-dryable or cod-drying printing ink and the like may also be used as the material in such a case, the light diffusing layer 5 is cured completely, rather than incompletely, before providing the light absorbing layer 6, and it is possible to obtain easily and economically the rear projection screen of this invention, similarly to the case of employing the above-mentioned production step.

Another embodiment of the rear projection screen according to this invention will now be explained below, referring to FIG. 10.

Figure 10:
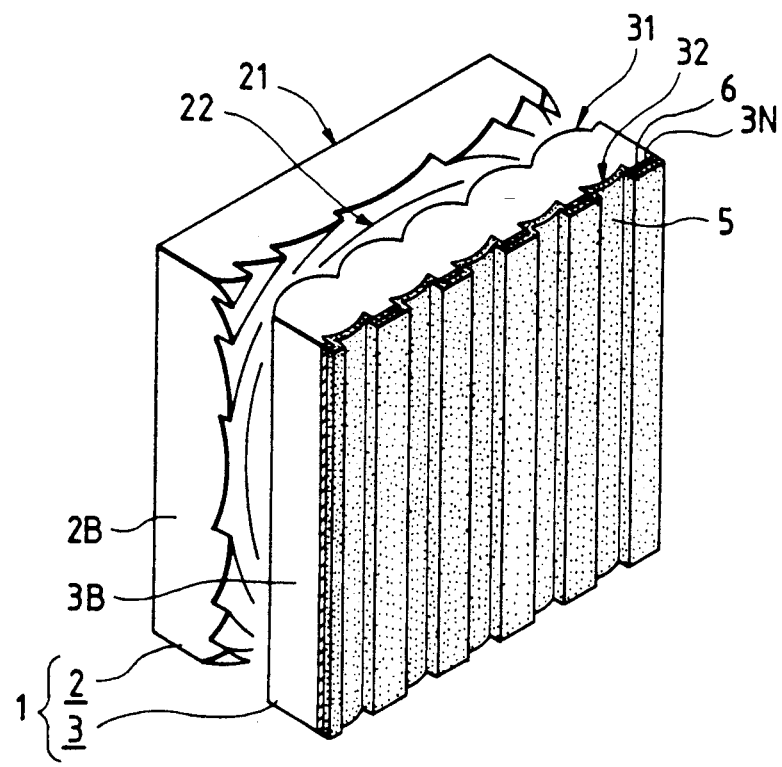
FIGS. 10 to 13 show perspective views of important portions of second to five embodiments, respectively, of the rear projection screen according to this invention.

FIG. 10 shows a perspective view of an important portion of a second embodiment of the rear projection screen according to this invention. The same portions as those in FIG. 3 are denoted by the same reference marks as used in FIG. 3, and explanation of those portions will be omitted.

The difference between the rear projection screen 1 in FIG. 10 and the rear projection screen 1 in FIG. 3 lies in that the light absorbing layer 6 in FIG. 3 is provided on the light diffusing layer 5 on the plane of emergence 32 of the second sheet member 3 whereas the light absorbing layer 6 in FIG. 10 is provided between the base 3B of the second sheet member 3 and the light diffusing layer 5.

In the rear projection screen 1 in FIG. 10, ambient light such as illuminating light is, in part, reflected by the surface of the light diffusing layer 5 before being absorbed by the light absorbing layer 6. resulting in a contrast lower than the contrast obtained with the rear projection screen 1 shown in FIG. 3. However, the incident rays are substantially free of diffusion in the base 3B, as in the rear projection screen 1 shown in FIG. 3. Therefore, there is substantially no loss of light through absorption by the light absorbing layer 6, as contrasted to the case of the conventional rear projection screen shown in FIG. 2b, and substantially the entire quantity of incident light is permitted to emerge. Accordingly, the total image contrast is effectively enhanced, as compared with the contrast obtained with the conventional rear projection screen.

As for image focusing characteristics, the rear projection screen of this embodiment has the same effect as in the rear projection screen of FIG. 3.

Of the rear projection screen 1 of FIG. 10, the second sheet member 3 can be produced by the same steps as the steps shown in FIGS. 9a to 9d, except that the sequence of the step of providing the light diffusing layer 5 shown in FIG. 9c and the step of providing the light absorbing layer 6 shown in FIG. 9d is reversed. Namely, a light absorbing black paint comprising an ultraviolet-curing resin is applied to the light non-transmitting areas 3N at the boundary portions of the lenticular lenses of the plane of emergence 32, and is incompletely cured by irradiation with ultraviolet rays, to form the light absorbing layer 6. Then, a material obtained by dispersing a light diffuser in a transparent binder comprising an ultraviolet-curing resin is applied to the entire surface of the plane of emergence 32, and is cured together with the light absorbing layer 6 by irradiation with ultraviolet rays, to form the light diffusing layer 5. The method of producing the rear projection screen, including the above-mentioned steps, also enables easy and economical production of the rear projection screen of this invention, similarly to the method comprising the steps for producing the second sheet member 3 illustrated in FIGS. 9a to 9d.

For the formation of the light absorbing layer 6, use may be made of a heat-dryable or cold-drying printing ink or the like, similarly to the case of the steps of FIGS. 9a to 9d. In that case, the light absorbing layer 6 is cured completely, rather than incompletely, before the formation of the light diffusing layer 5.

Now, a third embodiment of the rear projection screen according to this invention will be explained below, referring to FIG. 11.

Figure 11:
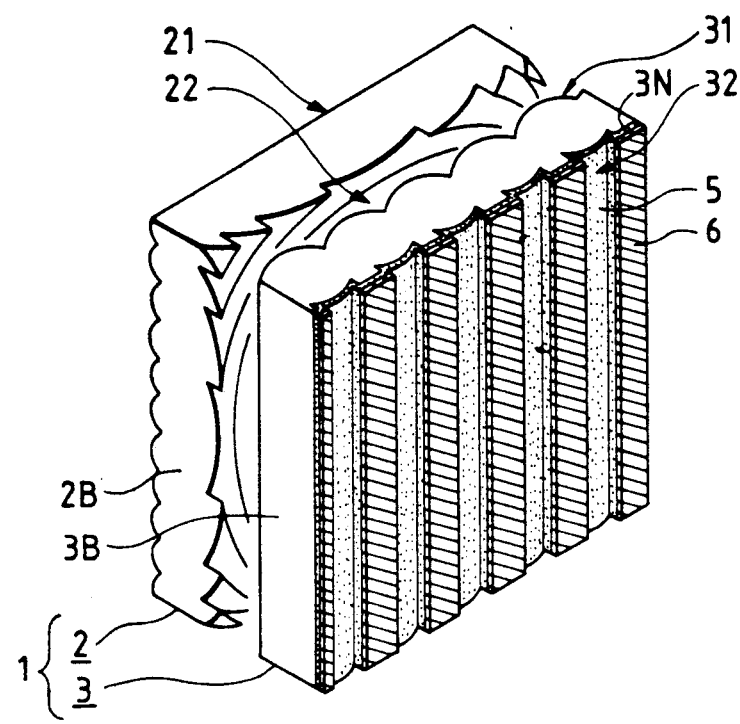

FIG. 11 is a perspective view showing an important portion of the third embodiment of the rear projection screen of this invention. The same portions as those in FIGS. 3 and 10 are denoted by the same reference marks as used in FIGS. 3 and 10, and explanation of those portions will be omitted.

The difference between the rear projection screen 1 in FIG. 11 and the rear projection screen 1 in FIG. 3 lies in that the plane of incidence 21 of the first sheet member 2 in FIG. 3 is a flat surface, whereas the plane of incidence 21 in FIG. 11 is provided with a geometry of a lenticular lens array of which the array direction is orthogonal to the array direction of the lenticular lens arrays on the pane of incidence 31 and the plane of emergence 32 of the second sheet member 3.

In the rear projection screen 1 shown in FIG. 11, the lenticular lenses on the plane of incidence 21 of the first sheet member 2 have the function of enlarging the vertical viewing angle. Where the viewing angle is saturated when the amount of the light diffuser in the light diffusing layer 5 is increased, therefore, the lenticular lenses on the plane of incidence 21 of the first sheet member 2 give directional characteristics with a further enlarged viewing angle. In this case, the focusing characteristics and contrast are slightly lowered, as compared with the case of the rear projection screen of FIG. 3. As far as a predominant contribution to the diffusion of light is made by the light diffusing layer 5, however, the slightly lowered focusing characteristics and contrast are yet better than those obtained with the conventional rear projection screen.

A fourth embodiment of the rear projection screen according to this invention will now be explained below, referring to FIG. 12.

Figure 12:
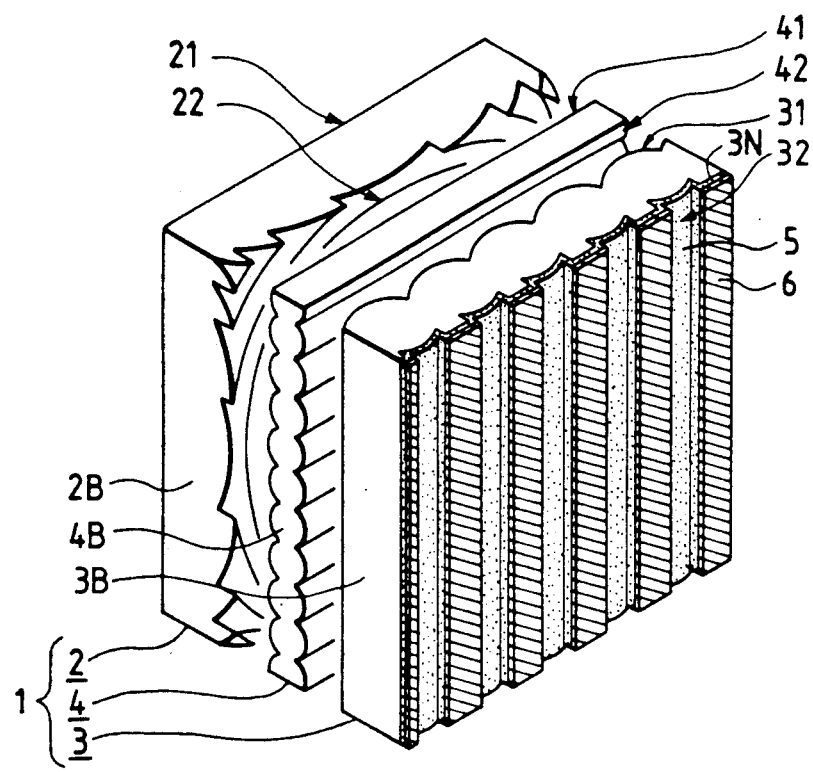

FIG. 12 shows a perspective view of an important portion of the fourth embodiment of the rear projection screen according to this invention. In the figure, there are shown the rear projection screen 1, first, second and third sheet members 2, 3 and 4, and plane of incidence 31, plane of emergence 32, base 3B and light non-transmitting areas 3N of the second sheet member. The first sheet member 2 and the second sheet member 3 in the rear projection screen 1 of this embodiment are equivalent respectively to the first sheet member 2 and the second sheet member 3 in the first embodiment shown in FIG. 3, and explanation of these sheet members will therefore be omitted.

Of the rear projection screen 1 shown in FIG. 12, the third sheet member 4 comprises lenticular lens arrays of which the array direction is orthogonal to the array direction of the lenticular lens arrays on the plane of incidence 31 and the plane of emergence 32 of the second sheet member 3. The third sheet member 4 in FIG. 12 is provided with a geometry of lenticular lens array at each o the plane of incidence and the plane of emergence, but the third sheet member 4 may have a flat surface on one side thereof.

In the rear projection screen 1 of FIG. 12, the lenticular lens arrays of the third sheet member 4 have the function of enlarging the vertical viewing angle. Where the viewing angle is saturated when the amount of the light diffuser in the light diffusing layer 5 of the second sheet member 3 is increased, therefore, the lenticular lens arrays of the third sheet member in this embodiment shown in FIG. 12 provide directional characteristics with a further enlarged viewing angle, in the same manner as the lenticular lenses of the plane of incidence 21 of the first sheet member 2 in the third embodiment shown in FIG. 11. It should be noted here that, in FIG. 11, the incident rays on the rear projection screen 1 pass through the lenticular lens array at the plane of incidence of the first sheet member 2 before passing through the Fresnel lens at the plane of emergence of the sheet member 2, whereas in FIG. 12, the incident rays pass through the Fresnel lens of the first sheet member 2 before passing through the lenticular lenses of the third sheet member 4. As a result, the fourth embodiment shown in FIG. 12 has better focusing characteristics, as compared with the third embodiment shown in FIG. 11.

In the above explanations, the binder (or vehicle) for the light diffusing layer and the light absorbing layer has been limited to ultraviolet-curing resin. This is because the ultraviolet-curing resins are most suitable for use as the binder, from the viewpoints of operability, such as rapid curing properties, processability at normal temperature, etc., and feasibility of formation of a highly hard film therefrom. As a matter of course, however, those electromagnetic wave curable resins, e.g., visible ray curable resins or electron ray curable resins, which fulfill the abovementioned requirements are also usable as the binder.

A fifth embodiment of the rear projection screen according to this invention wi now be explained below, referring to FIGS. 13 and 14.

Figure 13:
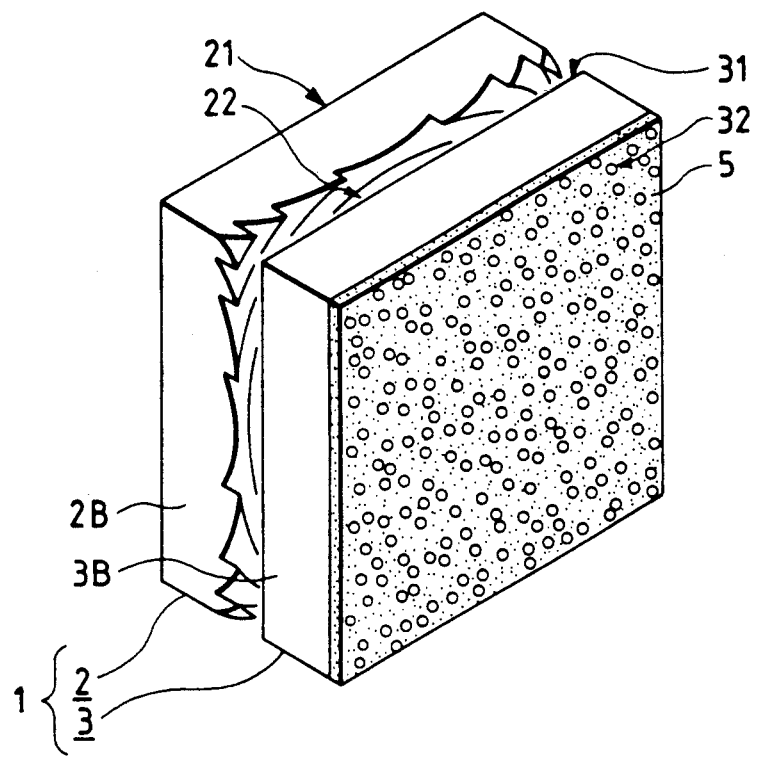

FIG. 13 is a perspective view showing an important portion of the fifth embodiment of the rear projection screen of this invention. In the figure, there are shown the rear projection screen 1, and first and second sheet members 2 and 3. The first sheet member in this embodiment is equivalent to the first sheet member in the first embodiment shown in FIG. 3, and explanation of the first sheet member will be therefore omitted.

In the second sheet member 3 of the rear projection screen 1 in FIG. 13, reference characters 31, 32 and 3B denote a plane of incidence, a plane of emergence, and a base, and numeral 5 denotes a light diffusing layer. The plane of incidence 31 and the plane of emergence 32 of the second sheet member 3 in this embodiment are both flat surfaces, and the light diffusing layer 5 is provided uniformly on the entire surface of the plane of emergence 32.

The light diffusing layer 5 comprises a transparent binder in which a first light diffuser with a particle diameter of 0.4 to 10 μm and a second light diffuser with a particle diameter of 30 to 300 μm are dispersed, and the thickness of the layer 5 is about 30 to 1000 μm. Materials usable as the light diffuser include a wide variety of materials, such as those mentioned in the explanation of the first embodiment above. Representative examples of the materials usable include calcite particles, as the first light diffuser, and spherical glass powder, as the second light diffuser. The calcite particles are a birefringent material of hexagonal system, having a refractive index of about 1.66 for ordinary rays and a refractive index of about 1.49 for extraordinary rays, and being rich in cleavability. Thus, it is possible to produce stably fine particles of calcite, leading to a greater interface area per unit volume and a high efficiency of light diffusion. On the other hand, spherical glass powder typically has a refractive index of about 1.6, and a spherical glass powder having a refractive index of about 2.4 at maximum is obtainable by increasing the lead content of the glass. The spherical glass powder, contrary to the calcite particles, has a smaller interface area per unit volume and a poorer efficiency of light diffusion, as compared with calcite. The spherical glass powder, however, is advantageous in that the loss of light due to reflection at interfaces is smaller, leading to brighter images. General commercial products of spherical glass powder include, for example, Glass Beads GP Series produced by Toshiba Glass Co., Ltd., of which 100 mesh, 150 mesh and 250 mesh grades and the like are preferable for use in the light diffusing layer according to this invention. When the first light diffuser and the second light diffuser mentioned above are used together as the light diffuser in the light diffusing layer so as to make most of the merits of both the light diffusers, it is possible to obtain a rear projection screen which is high in brightness and efficiency of light diffusion and has a wide viewing angle and good mass-producibility.

The light diffusing layer of this embodiment is not only applicable to rear projection screens but also applicable to reflection-type screens, whereby a reflection-type screen is obtainable which has a good combination of brightness of images and wideness of viewing angle and has good mass-producibility.

Now, a method of producing the second sheet member 3 of the rear projection screen 1 in FIG. 13 will be explained below.

FIGS. 14a to 14g are sectional view illustrating the steps for producing the second sheet member 3.

To produce the second sheet member 3, a phase 3B comprising a substantially transparent material is first prepared, as shown in FIG. 14a.

Next, as shown in FIG. 14b, the base 3B is coated with an adhesive 16 for fixing the second light diffuser such as spherical glass powder on the base 3B.

Then, as shown in FIG. 14c, the second light diffuser 17 such as spherical glass powder is scattered on the adhesive 16 by a flow coater or the like.

Next, as shown in FIG. 14d, the second light diffuser 17 such as spherical glass powder is pressed by a roller to be embedded, by half, into the adhesive, and the surplus portion of the light diffuser which has not been embedded is removed by a vibrator.

Subsequently, as shown in FIG. 14e, the first light diffuser 18 such as calcite particles is scattered by a flow coater or the like.

Then, as shown in FIG. 14f, the first light diffuser 18 such as calcite particles is pressed by a roller to be embedded into the adhesive, and the surplus portion of the light diffuser 18 is removed by a vibrator.

When the adhesive, at this state, is then cured by heating, the formation of the light diffusing layer 5 is completed, whereby the second sheet member shown in FIG. 13 is finished. Optionally, as shown in FIG. 14g, a light diffusing layer 19 similar to the light diffusing layer in the first embodiment shown in FIG. 3 may be provided to form the light diffusing layer 5 together with the previously formed light diffusing layer. In that case, when the light diffusing material used in the light diffusing layer provided later is a material having a small particle diameter similar to the first light diffuser 18 used in the former light diffusing layer, a further greater viewing angle is obtained, as compared with the construction shown in FIG. 14f. The light diffusing layer 19 provide later may be formed in the same manner as in the production steps according to the first embodiment shown in FIGS. 9a to 9d.

The method of producing the rear projection screen including the steps mentioned above makes it possible to obtain easily and economically the rear projection screen according to this embodiment.

The above explanations have been made referring to an optical system using a red, a green and a blue monochromic projection-type CRT and to an image display device using the optical system. As a matter of course, however, a system in which the number of the CRTs is increased to six, nine or the like, a system in which liquid-crystal elements are used instead of the CRTs as the video source, an optical system in which a color image on a video source such as a slide, a motion picture film, etc., (inclusive of a color image synthesized in the course of an optical system) is projected by a single projection lens, and image display devices using such an optical system, are also included in this invention.

As is clear from the above description, according to this invention, the light emitted from a video source such as a projection-type CRT passes through a projection lens to be incident on a rear projection screen, then passes through the screen without being diffused in sheet members constituting the screen, and, at the time of emerging from the last sheet member, is diffused horizontally and vertically by a light diffuser present in a light diffusing layer on the plane of emergence of the last sheet member. Therefore, images formed on the plane of emergence are not fuzzy, and good focusing characteristics are obtained.

Besides, a transparent binder in the light diffusing layer may be colored. In that case, the reflectivity for ambient light at the surface of the light diffusing layer is lowered. In addition, when ambient light once entering the screen emerges again to the viewer's side after being reflected a few times by the surfaces of the sheet members, the light passes through the light diffusing layer at least twice. Therefore, the proportion of the incident ambient light absorbed is increased, whereby undesirable brightening of dark portions of images due to the presence of the ambient light is obviated, and good contrast can be obtained.

Furthermore, a light absorbing layer may be provided in light non-transmitting areas (the areas through which light is substantially not transmitted) on the plane of emergence of the screen. In that case, the incident light on the screen is rarely absorbed by the light absorbing layer through being diffused, before to reaching the plane of emergence. In addition, the light absorbing layer is capable of reducing the reflection of ambient light such as illuminating light, thereby yielding a good contrast.

Moreover, when the hardness of the transparent binder in the light diffusing layer and the hardness of the light absorbing layer are set to be higher than the hardness of the sheet member, the hardness of the exposed surface of the rear projection screen on the viewer's side is increased, as compared with the conventional rear projection screens, so that damage to the exposed surface during handling of the screen is reduced.

Further, when the rear projection screen is produced by a method in which ultraviolet-curing resins are used as materials for the binder of the light diffusing layer and for the light absorbing layer and in which a step of coating or printing and a step of curing by irradiation with ultraviolet rays are used for forming the light diffusing layer and the light absorbing layer, it is possible to produce easily and economically the rear projection screen.

What is claimed is:

1. A rear projection screen comprising one or more sheet members, wherein a base constituting the last sheet member, through which light transmitted sequentially through the sheet members from the side of a plane of incidence is transmitted last, comprises a transparent material, and a light diffusing layer is provided at a plane of emergence of the last sheet member, the light diffusing layer including a light diffuser and a transparent binder, the transparent binder having a refractive index different from a refractive index of the light diffuser and being at least one of an ultraviolet curable material and a colored material.

2. The rear projection screen as set forth in claim 1, wherein the sheet member comprises dispersed therein a light diffuser having a refractive index different from the refractive index of the base.

3. The rear projection screen as set forth in claim 1, comprising two sheet members, wherein a first sheet member provided on the incidence side of the screen comprises a Fresnel lens, whereas a second sheet member has a plane of incidence and a plane of emergence each having a geometry of a lenticular lens array, the array directions of the lenticular lens arrays being parallel to each other, and the light diffusing layer is provided at the plane of emergence of the second sheet member.

4. The rear projection screen as set forth in claim 1, comprising two sheet members, wherein the two sheet members comprises a first sheet member provided on the incidence side of the screen, and a second sheet member, a plane of incidence of the first sheet member has a geometry of a lenticular lens array, the array direction of the lenticular lens array being substantially orthogonal to the array direction of a lenticular lens array of the second sheet member, and a plane of emergence of the first sheet member has a geometry of a Fresnel lens.

5. The rear projection screen as set forth in claim 1, comprising three sheet members, wherein the three sheet members comprise a first sheet member, a third sheet member and a second sheet member which are arranged in parallel and in that order from the incidence side toward the emergence side of the screen, the first sheet member comprises a Fresnel lens, the third sheet member comprises a lenticular lens array, the second sheet member has a plane of incidence and a plane of emergence each having a geometry of a lenticular lens array, the array directions of the lenticular lens arrays of the second sheet member being substantially orthogonal to the array direction of the lenticular lens array of the third sheet member, the light diffusing layer is provided at the pane of emergence of the second sheet member, and the third sheet member comprising the lenticular lens array is disposed between the first sheet member and the second sheet member.

6. The rear projection screen as set forth in claim 1, wherein the light diffusing layer comprises a light diffuser having a particle diameter of 0.4 to 10 $\mu$m, and the light diffusing layer has a thickness of 2 to 140 $\mu$m.

7. The rear projection screen as set forth in claim 1, wherein the light diffusing layer comprises a first light diffuser having a particle diameter of 0.4 to 10 $\mu$m, and a second light diffuser having a particle diameter of 30 to 300 $\mu$m and differing from the first light diffuser in optical characteristics, the first and second light diffusers being dispersed in the transparent binder having a refractive index different from the refractive indices of the first and second light diffusers, and the light diffusing layer has a thickness of 30 to 1000 $\mu$m.

8. The rear projection screen as set forth in claim 6 or 7, wherein the light diffusing layer comprises 200 to 800 parts by weight of at least one of the light diffusers per 100 parts by weight of the transparent binder.

9. The rear projection screen as set forth in claim 1, wherein the plane of incidence of the last sheet member, provided with the light diffusing layer on the plane of emergence thereof, has a geometry of lenticular lens array comprising an array of portions of the surface of an elliptic cylinder, the relevant ellipse having a major axis direction set in the thickness direction of the last sheet member and an eccentricity approximately equal to the inverse of the refractive index of the base of the last sheet member, whereas the plane of emergence of the last sheet member has a geometry of a lenticular lens array comprising an array of portions of the surface of a substantially elliptic or circular cylinder projected to the viewer's side, the array directions of both the lenticular lens arrays being the same, and, in a sectional plane parallel to the array directions of the lenticular lens arrays of the last sheet member, the ellipse defining the section of the plane of incidence of the last sheet member has one of the two foci thereof located in the base of the last sheet member and the other focus located in the vicinity of the surface of the light diffusing layer provided at the plane of emergence.

10. The rear projection screen as set forth in claim 1, wherein the transparent binder in the light diffusing layer is colored.

11. The rear projection screen as set forth in claim 1, wherein the light diffuser in the light diffusing layer is colored.

12. The rear projection screen as set forth in claim 10 or 11, wherein the spectral transmissivity, for visible rays, of the sheet member provided with the light diffusing layer is greater in the wave length region of 400 to 520 nm than in other wave length regions.

13. The rear projection screen as set forth in any one of claims 4 to 7 and 9, wherein the sheet member provided with the light diffusing layer comprises a light absorbing layer between the base of the sheet member and the light diffusing layer, in light non-transmitting areas of the lenticular lens array provided at the plane of emergence.

14. The rear projection screen as set forth in any one of claims 4 to 7 and 9, wherein the sheet member provided with the light diffusing layer comprises a light absorbing layer on the light diffusing layer, in light non-transmitting areas of the lenticular lens array provided at the plane of emergence.

15. The rear projection screen as set forth in claim 13, wherein the light non-transmitting areas of the lenticular lens array on the plane of emergence of the sheet member provided with the light diffusing layer are projected to the viewer's side relative to the lenticular lens, and the light diffusing layer is provided to be continuous at the boundary of the projected light non-transmitting area and the lenticular lens portion.

16. The rear projection screen as set forth in claim 1, wherein the sheet member provided with the light diffusing layer is so provided that the transparent binder in the light diffusing layer has a hardness higher than the hardness of the base.

17. The rear projection screen as set forth in claim 1, wherein the light absorbing layer has a hardness higher than the hardness of the base.

18. A method of producing a rear projection screen comprising one or more sheet members through which light is sequentially transmitted from the side of a plane of incidence of the screen, a lenticular lens array, a light diffusing layer comprising a light diffuser dispersed and supported in a transparent binder. Both the lenticular lens array and the light diffusing layer being provided on the side of a plane of emergence of the last sheet member through which the light is transmitted last, and a light absorbing layer provided between a base constituting the last sheet member and the light diffusing layer, in light non-transmitting areas of the lenticular lens array at the plane of emergence, the method comprising the steps of:

preparing an ultraviolet-curing resin as a material for the transparent binder of the light diffusing layer;

coating a base of the last sheet member with a coating material for forming the light absorbing layer, in light non-transmitting areas of the lenticular lens array, and drying the coating material;

coating the entire surface of the lenticular lens array, inclusive of the light non-transmitting areas, with a coating material for forming the light diffusing layer; and curing the coating material for forming the light diffusing layer by irradiation with ultraviolet rays.

19. A method of producing a rear projection screen comprising one or more sheet members through which light is sequentially transmitted from the side of a plane of incidence of the screen, a lenticular lens array, a light diffusing layer comprising a light diffuser dispersed and supported in a transparent binder, both the lenticular lens array and the light diffusing layer being provided on the side of a plane of emergence of the last sheet member through which the light is transmitted last, and a light absorbing layer provided on the light diffusing layer, in light non-transmitting areas of the lenticular lens array at the plane of emergence, the method comprising the steps of:

preparing an ultraviolet-curing resin as a material for the transparent binder of the light diffusing layer;

coating the base of the last sheet member with a coating material for forming the light diffusing layer, in the entire area of the lenticular lens array inclusive of the light non-transmitting areas;

curing the coating material by irradiation with ultraviolet rays; and coating the light non-transmitting areas of the lenticular lens array with a coating material for forming the light absorbing layer, and drying the coating material 20. A method of producing a rear projection screen comprising one or more sheet members through which light is sequentially transmitted from the side of a plane of incidence of the screen, a lenticular lens array, a light diffusing layer comprising a light diffuser dispersed and supported in a transparent binder, both the lenticular lens array and the light diffusing layer being provided on the side of a plane of emergence of the last sheet member through which the light is transmitted last, and a light absorbing layer provided between a base constituting the last sheet member and the light diffusing layer, in light non-transmitting areas of the lenticular lens array at the plane of emergence, the method comprising the method comprising the steps of;

preparing an ultraviolet-curing resin as a material for the transparent binder of the light diffusing layer and an utraviolet-curable resin as a material for the light absorbing layer;

coating a base of the last sheet member with a coating material for forming the light absorbing layer, in light non-transmitting areas of the lenticular lens array;

incompletely curing the coating material by irradiation with ultraviolet rays;

coating the entire surface of the lenticular lens array inclusive of the light non-transmitting portions with a coating material for forming the light diffusing layer; and curing simultaneously the coating materials for the light absorbing layer and the light diffusing layer by irradiation with ultraviolet rays.

21. A method of producing a rear projection screen comprising one or more sheet members through which light is sequentially transmitted from the side of a plane of incidence of the screen, a lenticular lens array, a light diffusing layer comprising a light diffuser dispersed and supported in a transparent binder, both the lenticular lens array and the light diffusing layer being provided on the side of a plane of emergence of the last sheet member through which the light is transmitted last, and a light absorbing layer provided on the light diffusing layer, in light non-transmitting areas of the lenticular lens array at the plane of emergence, the method comprising the steps of:

preparing an ultraviolet-curing resin as a material for the transparent binder of the light diffusing layer and ultraviolet-curable resin as a material for the light absorbing layer;

coating the base of the last sheet member with a coating material for forming the light diffusing layer, in the entire area of the lenticular lens array inclusive of the light non-transmitting area;

incompletely curing the coating material for the light diffusing layer by irradiation with ultraviolet rays;

coating the light non-transmitting areas of the lenticular lens array with a coating material for forming the light absorbing layer; and curing simultaneously the coating materials for the light diffusing layer and the light absorbing layer by irradiation with ultraviolet rays.

22. A method of producing a rear projection screen comprising one or more sheet members through which light is sequentially transmitted from the side of a plane of incidence of the screen, a lenticular lens array, and a light diffusing layer comprising a light diffuser dispersed and supported in a transparent binder, both the lenticular lens array and the light diffusing layer being provided on the side of a plane of emergence of the last sheet member through which the light is transmitted last, the method comprising the steps of:

applying an adhesive to the base of the last sheet member;

scattering a second light diffuser having a particle diameter of 30 to 300 μm on the adhesive;

pressing the second light diffuser to fix the second light diffuser on the base;

scattering a first light diffuser having a particle diameter of 0.4 to 10 μm;

pressing the first light diffuser to fix the first light diffuser on the base; and curing the adhesive.

23. A rear projection image display device using the rear projection screen as set forth in any one of claims 1 to 7.

24. A rear projection screen comprising three sheet members, wherein a base constituting the last sheet member, through which light transmitted sequentially through the three sheet members from the side of a plane of incidence is transmitted last, comprises a transparent material, and a light diffusing layer is provided at a plane of emergence of the last sheet member, and wherein the three sheet members comprise a first sheet member, a third sheet member and a second sheet member which are arranged in parallel and in that order from the incidence side toward the emergence side of the screen, the first sheet member comprises a Fresnel lens, the third sheet member comprises a lenticular lens array, the second sheet member has a plane of incidence and a plane of emergence each having a geometry of a lenticular lens array, the array directions of the lenticular lens arrays of the second sheet member being substantially orthogonal to the array direction of the lenticular lens array of the third sheet member, a slight diffusing layer is provided at the plane of emergence of the second sheet member, and the third sheet member comprising the lenticular lens array is disposed between the first sheet member and the second sheet member.

* * * * *